United States Patent
Park et al.

(10) Patent No.: US 11,232,891 B2
(45) Date of Patent: Jan. 25, 2022

(54) COMPOSITION FOR 3 DIMENSIONAL PRINTING

(71) Applicant: LG CHEM, LTD., Seoul (KR)

(72) Inventors: Sai Bom Park, Daejeon (KR); Jin Kyu Lee, Daejeon (KR); Sang Bum Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 311 days.

(21) Appl. No.: 16/462,449

(22) PCT Filed: Nov. 21, 2017

(86) PCT No.: PCT/KR2017/013240
§ 371 (c)(1),
(2) Date: May 20, 2019

(87) PCT Pub. No.: WO2018/093230
PCT Pub. Date: May 24, 2018

(65) Prior Publication Data
US 2019/0318857 A1     Oct. 17, 2019

(30) Foreign Application Priority Data

Nov. 21, 2016 (KR) .................. 10-2016-0155255

(51) Int. Cl.
| | |
|---|---|
| *H01F 1/28* | (2006.01) |
| *B33Y 70/00* | (2020.01) |
| *B22F 1/00* | (2006.01) |
| *B33Y 10/00* | (2015.01) |
| *B22F 10/10* | (2021.01) |

(52) U.S. Cl.
CPC .............. *H01F 1/28* (2013.01); *B22F 1/0018* (2013.01); *B33Y 70/00* (2014.12); *B22F 10/10* (2021.01); *B33Y 10/00* (2014.12)

(58) Field of Classification Search
CPC ....................................................... C08K 7/22
See application file for complete search history.

(56) References Cited

U.S. PATENT DOCUMENTS 5,123,989 A * 6/1992 Horiishi .................. C08J 5/124
                                                           156/272.4
6,476,113 B1 * 11/2002 Hiles .................. B29C 45/0013
                                                              524/439

(Continued)

FOREIGN PATENT DOCUMENTS

| CN | 103213281 | 7/2013 |
| DE | 102015003378 | 9/2016 |

(Continued)

OTHER PUBLICATIONS

International Search Report of the International Searching Authority corresponding to International Patent Application No. PCT/KR2017/013240, dated Oct. 11, 2018. (7 pages with English translation).

*Primary Examiner* — Alexandre F Ferre
(74) *Attorney, Agent, or Firm* — Myers Bigel, P.A.

(57) ABSTRACT

The present application relates to a composition for 3D printing, a 3D printing method using the same, and a three-dimensional shape comprising the same, and provides an ink composition capable of realizing precise formation of a three-dimensional shape and uniform curing physical properties of the three-dimensional shape.

20 Claims, 1 Drawing Sheet

(56) References Cited

U.S. PATENT DOCUMENTS

| | | |
|---|---|---|
| 2003/0168640 A1 | 9/2003 | Kirsten |
| 2009/0039309 A1 | 2/2009 | Bose et al. |
| 2009/0255442 A1 | 10/2009 | Hollman et al. |
| 2013/0157053 A1* | 6/2013 | Heikkila .................. C08K 3/08 428/372 |
| 2016/0107288 A1* | 4/2016 | Orilall .................... B24B 37/22 451/529 |

FOREIGN PATENT DOCUMENTS

| | | |
|---|---|---|
| JP | 2003105067 | 4/2003 |
| JP | 2008066298 | 3/2008 |
| JP | 2015096646 A | 5/2015 |
| JP | 2016011331 | 1/2016 |
| KR | 1020060025171 | 3/2006 |
| KR | 101266923 | 5/2013 |
| KR | 1020150004213 | 1/2015 |
| KR | 1020160022156 | 2/2016 |
| WO | 2009/126437 | 10/2009 |
| WO | 2015175880 | 11/2015 |
| WO | 2015194678 A1 | 12/2015 |
| WO | 2016/178545 | 11/2016 |

* cited by examiner

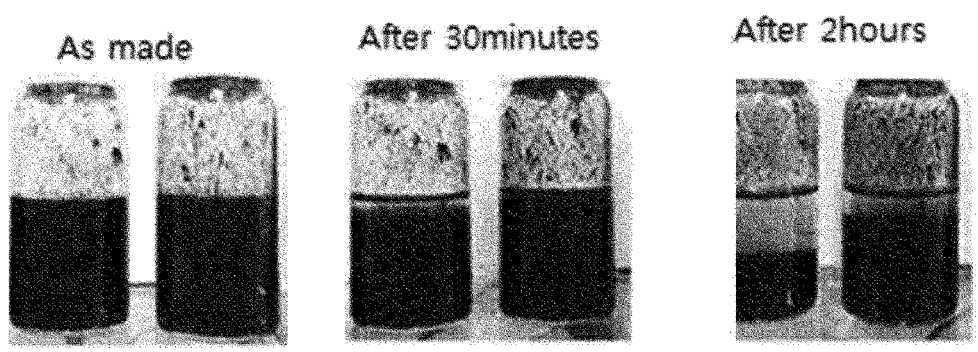

COMPOSITION FOR 3 DIMENSIONAL PRINTING

CROSS-REFERENCE TO RELATED APPLICATIONS

This application is a 35 U.S.C. § 371 national stage application of PCT International Application No. PCT/KR2017/013240, filed Nov. 21, 2017, which claims priority from Korean Patent Application No. 10-2016-0155255, filed Nov. 21, 2016, the contents of which are incorporated herein in their entireties by reference. The above-referenced PCT International Application was published in the Korean language as International Publication No. WO 2018/093230 A2 on May 24, 2018.

TECHNICAL FIELD

The present application relates to a composition for 3D printing, a method of 3D printing using the same, and a three-dimensional shape comprising the same.

BACKGROUND ART

The present application relates to a magnetic body composite which can be applied to three-dimensional printing and an ink composition comprising the same. The three-dimensional printer has a three-dimensional printing mechanism configured to three-dimensionally form a physical object. Researches related to a composition for 3D printing as a three-dimensional printing ink for three-dimensionally forming a physical object by such a three-dimensional printer, have been continuing.

In implementing the desired patterns or solid shapes, conventional 3D printing methods have been carried out by a method for curing a resin composition by heat, light, or the like. However, among these methods, the case of the thermosetting type is a relatively simple manufacturing process in which polymer filaments are thermally melted, extruded and dropped in drops at the designated point to complete a shape of laminating layer by layer, but there are problems such as an imprecise shape and non-uniform curing due to an equipment supplying heat, phase separation between organic/inorganic composite materials and heat shrinkage due to heating/cooling. In addition, the case of the photo-curable type can express precisely, but there are problems such as size of equipment, storage and low hardness after curing.

DISCLOSURE

Technical Problem

The present application relates to a composition used as an ink of a 3D printer, and provides a composition capable of precisely forming a three-dimensional solid shape and implementing uniform curing properties of a three-dimensional shape.

Technical Solution

The present application relates to a composition for 3D printing. The composition for 3D printing can be applied, for example, to printing three-dimensional physical objects to form a three-dimensional shape. In addition, the composition can be applied to sealing electronic devices. For example, the composition can be applied to encapsulating a microelectronic device, for example, a micro-battery.

An exemplary composition for 3D printing may comprise magnetic particles and gas-containing particles. The magnetic particles and the gas-containing particles may form a magnetic composite. For example, the magnetic composite may be formed by surrounding the gas-containing particles with the magnetic particles or surrounding the magnetic particles with the gas-containing particles. As the composition for 3D printing comprises the above magnetic composite, the present application makes it possible to cure the composition with vibrational heat of the magnetic particles and enables uniform curing by the gas-containing particles, as described below. The magnetic particles may have two or more magnetic domains (multi-magnetic domains). In addition, the magnetic particles may have irregularly arranged magnetic domains when an external magnetic field is absent, and be magnetized by an external alternate-current magnetic field. Here, the irregular arrangement of the magnetic domains may mean a state where magnetic directions existing in the magnetic domains are each different and not aligned, and in this case, may be a state without magnetism as the net value of the magnetization at room temperature is zero. However, when an external alternate-current magnetic field is applied, the magnetic directions of the magnetic domains are aligned, whereby the magnetic particles can be magnetized. The magnetic particles may be super-paramagnetic particles, but are not limited thereto. In the 3D printing method according to the present application, the composition is applied in three dimensions to form a three-dimensional shape, and vibrational heat is generated from the magnetic particles through the application of a magnetic field, whereby the composition for 3D printing can be uniformly cured.

Among the existing 3D printing methods, there is also a method for curing or sintering a resin using a technique to generate heat by adding a metal or a conductive material (carbon or carbon nanotube) and electromagnetically inducing or irradiating it with microwaves, but in the case of electromagnetic induction, the temperature difference between the contact surface and the inside may be generated to cause a problem in the physical properties of the resin after curing, and in the case of microwaves, there is a risk of exposure to the human body during the replacement operation in the process.

The present application generates vibrational heat by magnetization reversal of magnetic particles through electromagnetic induction heating, whereby the generated heat can cure a thermosetting resin or the like to be described below. In the case of the conventional technique to generate heat by electromagnetic induction, heat is generated by eddy current, where heat was generated by hysteresis loss of a metal or a magnetic material. However, in the case of the present application, as the particles of the magnetic material become smaller to be nano-sized, the hysteresis loss of the magnetic material itself becomes smaller and only the saturation magnetization value exists. Therefore, the present application can generate heat due to vibrations between magnetic materials, other than eddy currents. That is, in the present application, the magnetic material itself vibrates due to the coercive force of the magnetic particles under an external magnetic field, where the resin can be cured using the generated heat, and the curing proceeds from the inside of the composition, so that the cured product can have excellent physical properties. Accordingly, the present application can realize uniform and stable curing.

As described above, the magnetic particles may comprise two or more magnetic domains. In the present specification, the term "magnetic domain" generally means a region in which magnetization directions are differently divided within a magnetic material. In the present application, magnetic particles having two or more magnetic domains are strongly magnetized by an external alternate-current magnetic field to generate vibrational heat, and when the magnetic field is eliminated, the magnetic particles return to the original magnetic domains, whereby magnetic particles with low residual magnetization of hysteresis loss can be provided.

In one example, the material of the magnetic particles is not particularly limited. The magnetic material may include pure iron, iron oxide, ferrite, iron alloy, cobalt alloy, nickel alloy, or manganese alloy. The shape of the magnetic particles may be a sphere, an ellipsoid, a tetrahedron, a hexahedron, a triangular prism, a quadrangular prism, a cylinder, an elliptical column, a polygonal column or an amorphous shape. According to one example of the present application, the magnetic particles may be spherical. In addition, the density of the magnetic particles may be appropriately selected in consideration of the object of the present application. For example, the density of the particles may be 1 g/cm$^3$ to 10 g/cm$^3$, 1.5 g/cm$^3$ to 8.5 g/cm$^3$, or 3 g/cm$^3$ to 7 g/cm$^3$. As the magnetic particles are combined with the above-described gas-containing particles in the density range and are dispersed in a uniform distribution upon 3D printing, the present application can realize the uniform curing.

In one example, the magnetic particles may have a coercive force in a range of 1 to 200 kOe, 10 to 150 kOe, 20 to 120 kOe, 30 to 100 kOe, 40 to 95 kOe, or 50 to 95 kOe. The term "coercive force" herein may mean an intensity of the critical magnetic field required to reduce the magnetization of the magnetic material to zero. More specifically, a magnetic material magnetized by an external magnetic field maintains a certain degree of magnetized state even if a magnetic field is removed, where the intensity of a magnetic field capable of making the magnetization degree to zero by applying a reverse magnetic field to the magnetic material thus magnetized is referred to as a coercive force. The coercive force of the magnetic material may be a criterion for distinguishing a soft magnetic material or a hard magnetic material, and the magnetic particles of the present application may be a soft magnetic material. By controlling the coercive force of the magnetic particles in the above range, the present application more easily realizes the magnetization reversal of the magnetic material to generate vibrational heat to a desired degree in the present application, so that it can satisfy a desired degree of curing physical properties by uniform curing of the resin.

In one example, for a physical property value measured in the present application, when the measured value is a value varying with temperature, the measured temperature may be room temperature, for example, 25° C.

Furthermore, in one example, the magnetic particle has a saturation magnetization value at 25° C. in a range of 20 to 150 emu/g, 30 to 130 emu/g, 40 to 100 emu/g, 50 to 90 emu/g, or 60 to 85 emu/g. By being capable of controlling the magnetic particles to have a relatively large saturation magnetization value and thus generating heat by vibration between magnetic particles other than eddy currents, the present application can satisfy curing physical properties by uniform curing of the resin. In the present application, the measurement of physical properties of the magnetic particles can be calculated by the value of VSM (Vibrating Sample Magnetometer). The VSM is a device that measures magnetization values of samples by recording the applied magnetic field applied by a Hall probe and recording the electromotive force obtained on applying vibration to the sample by Faraday's law. According to Faraday's law, it can be seen that if the N pole of a bar magnet is directed and pushed towards the coil, the galvanometer moves and the current flows through the coil. The resultant current is called induction current, which is said to have been made by induced electromotive force. The VSM is a method of detecting the induced electromotive force, which occurs on vibrating a sample by such a basic operation principle, in the search coil, to measure the magnetization value of the sample by this electromotive force. The magnetic characteristics of a material can be measured simply as functions of magnetic field, temperature and time, and quick measurement in a magnetic force of up to 2 Tesla and a temperature range of 2 K to 1273 K is possible.

In an embodiment of the present application, the magnetic particles may have an average particle diameter in a range of 20 nm to 300 nm, 30 nm to 250 nm, 40 nm to 230 nm, or 45 nm to 220 nm. In addition, the magnetic domains in the magnetic particles may have an average size in a range of 10 to 50 nm or 20 to 30 nm. The present application can generate heat capable of performing the uniform curing of the composition in the composition by controlling the number of magnetic domains and the magnitude of the coercive force of the magnetic particles to an appropriate range in the particle size range. The present application can generate sufficient vibrational heat on curing through a low coercive force and a large number of magnetic domains by controlling the size of the particles to 20 nm or more, and allow only the saturation magnetization value to be present while reducing hysteresis loss of the magnetic material itself, thereby realizing uniform and stable curing by controlling the particle size to 300 nm or less.

If the magnetic particles of the present application can generate heat through electromagnetic induction heating, the material is not particularly limited. In one example, the magnetic particles may satisfy Formula 1 below.

$$MX_aO_b \qquad \text{[Formula 1]}$$

In Formula 1 above, M is a metal or a metal oxide, X includes Fe, Mn, Co, Ni or Zn, and |a×c|=|b×d| is satisfied, where c is the cation charge of X, and d is the anion charge of oxygen. In one example, M may be Fe, Mn, Mg, Ca, Zn, Cu, Co, Sr, Si, Ni, Ba, Cs, K, Ra, Rb, Be, Li, Y, B, or an oxide thereof. For example, when $X_aO_b$ is $Fe_2O_3$, c may be +3 and d may be −2. Also, for example, when $X_aO_b$ is $Fe_3O_4$, it can be expressed as $FeOFe_2O_3$, so that c may be +2 and +3, respectively, and d may be −2. The magnetic particles of the present application are not particularly limited as long as they satisfy Formula 1 above, and may be, for example, $MFe_2O_3$.

In one example, the 3D printing composition of the present application may comprise, as magnetic particles, a compound of Formula 1 above alone, or a mixture of compounds of Formula 1 or a compound doping a compound of Formula 1 with an inorganic substance. The inorganic substance may comprise a monovalent to trivalent cationic metal or an oxide thereof, and two or more of plural cationic metals may be used.

In one example, the magnetic particles may comprise those having surface-treated particle surfaces. That is, the composition of the present application may comprise particles surface-treated with a metal, a metal oxide, an organic substance or an inorganic substance on the surface of the magnetic particles. The present application can prevent the magnetic particles from losing the coercive force of the magnetic material by oxidation in air through the surface treatment. Furthermore, the surface treatment can improve compatibility with the filler, the dispersant organic solvent and the like to be described below, and improve dispersibility of the composition. In one example, the surface treatment can form a polymer of polymethyl methacrylate (PMMA) on the surface by attaching a methyl methacrylate (MMA) monomer to a magnetic particle having a carboxyl group on its surface. In addition, the surface treatment can be carried out by being subjected to an acid treatment to remove the oxide film on the surface, and the surface treatment can be also carried out through a method of coating silica particles.

In an embodiment of the present application, the gas-containing particles may be hollow particles. The gas-containing particles may have a structure in which one or more voids are contained in the particle and the void is filled with the gas. The gas-containing particles may comprise an inorganic material, an organic material, or an organic-inorganic composite. Specifically, the inorganic particle as the gas-containing particle may comprise one or more selected from the group consisting of silicate, silica, titanium and iron, but is not limited thereto. In addition, the organic particle as the gas-containing particle may include one or more selected from the group consisting of a liposome, a polymer, and a hydrated gel, but is not limited thereto.

In this specification, the gas-containing particle may mean a form in which bubbles are contained in a liquid or a solid, but is not limited thereto, where any form in which a hole exists in the particle may be included. The material containing the gas may be exemplified by glass (e.g., soda-lime-borosilicate glass), a polymer, a surfactant, a lipid, a protein (e.g. albumin), silica, a ceramic or a metal (e.g., titanium oxide), a carbon material (e.g., graphene) or a combination thereof. The bubbles may be micro bubbles or nano bubbles composed of the above materials. The gas in the gas-containing particles may include air, nitrogen, carbon dioxide, methane gas, perfluorocarbon, or the like.

The shape of the gas-containing particles may be a sphere, an ellipsoid, a tetrahedron, a hexahedron, a triangular prism, a quadrangular prism, a cylinder, an elliptical column, a polygonal column or an amorphous shape. According to one example of the present application, the gas-containing particles may be spherical.

The density of the gas-containing particles can be appropriately selected in consideration of the object of the present application. For example, the density of the gas-containing particles may be in a range of 0.01 $g/cm^3$ to 1.02 $g/cm^3$, 0.1 $g/cm^3$ to 0.95 $g/cm^3$, or 0.2 $g/cm^3$ to 0.8 $g/cm^3$. In one example, the density in the present application can be obtained by using a method of dispersing the particles in a solvent having a specific density and deducing it. By controlling the density of the gas-containing particles within the above range, they can be bonded to the above-mentioned magnetic particle to lower the density of the composite, and the present application can provide a composition having long-term dispersion stability and simultaneously realize excellent 3D printing performance.

The average size of the gas-containing particles can be appropriately selected in consideration of the object of the present application. For example, the average size of the gas-containing particles may be 10 nm to 100 μm, 50 nm to 90 μm, 100 nm to 50 μm, 200 nm to 30 μm, or 500 nm to 25 μm. In addition, the average size of the composite can be suitably selected in consideration of the object of the present application. For example, the average size of the composite may be 10 nm to 1000 μm, 50 nm to 900 μm, 100 nm to 500 μm, 200 nm to 300 μm, or 500 nm to 250 μm. By controlling the size range, the present application can realize adequate dispersibility, uniform cure degree and excellent 3D printing performance.

In an embodiment of the present application, the density of the composite can be suitably selected in consideration of the object of the present application. For example, the density of the composite may be 0.1 $g/cm^3$ to 10 $g/cm^3$, 0.5 $g/cm^3$ to 8 $g/cm^3$, 1.5 $g/cm^3$ to 7 $g/cm^3$, or 3.5 $g/cm^3$ to 5.5 $g/cm^3$. When the density of the composite is within the above range, long-term dispersion stability can be ensured in the composition and excellent 3D printing performance can be realized.

The magnetic particles and the gas-containing particles may have their surfaces physically or chemically bonded to each other. The magnetic particles and the gas-containing particles may be bonded through a known inter-particle bonding method in the art, and the method is not particularly limited. According to one example of the present application, the magnetic particles and the gas-containing particles may have their surfaces bonded to each other by an acid-base reaction, electrostatic attraction, covalent bonding or hydrophilic to hydrophobic interaction. According to one example of the present application, an acid base reaction can be used, and specifically, the magnetic particles are surface-treated with any one substituent of an acid group and a base, the gas-containing particles are surface-treated with the other substituent, and then they may be bonded through a reaction in an aqueous solution.

In one example, the gas-containing particles may be included in an amount of 80 to 200 parts by weight, 90 to 180 parts by weight, 100 to 170 parts by weight or 110 to 160 parts by weight, relative to 100 parts by weight of the magnetic particles. The present application makes it possible to have uniform dispersibility in an ink composition within the above content range, and to realize excellent 3D printing performance within the above range.

Also, in one example, the 3D printing composition may further comprise a dispersant such that the magnetic particles can be uniformly dispersed. Here, as the usable dispersant, for example, a surfactant having an affinity with the surface of the magnetic particle and having good compatibility with a resin to be described below, such as a nonionic surfactant, can be used. In addition, as the dispersant, a dispersant of a type containing an acidic or basic group, a high molecular weight acrylic polymer type having a weight average molecular weight of 10,000 or more, an inorganic soda type, or a metal salt type, and the like can be exemplified, and the composition of the present application may comprise one or more dispersants. The dispersant may be included in an amount of 0.01 to 10 parts by weight, 0.1 to 8 parts by weight, or 0.15 to 5 parts by weight, relative to 100 parts by weight of a thermosetting resin to be described below.

Furthermore, in one example, the 3D printing composition may further comprise a dispersion medium. As the dispersion medium, an inorganic solvent or an organic solvent may be used. The inorganic solvent may be exemplified by water or the like. The organic solvent may be exemplified by hexane, ethanol, silicone oil or polydimethylsiloxane, and the like. The content of the composite in the dispersion medium may be suitably selected in consideration of the object of the present application or application fields of the composition. For example, the content of the composite in the dispersion medium may be 0.1 to 90 wt %, 0.5 to 80 wt %, 1 to 70 wt %, 3 to 55 wt %, 4 to 30 wt %, 4.5 to 15 wt %, or 4.8 to 9 wt %. The density of the dispersion medium may be appropriately selected in consideration of the object of the present application. In one example, the density of the dispersion medium may be, for example, 0.5 g/cm$^3$ to 2 g/cm$^3$, 0.8 g/cm$^3$ to 1.8 g/cm$^3$, or 1.2 g/cm$^3$ to 1.5 g/cm$^3$. When the density of the dispersion medium is within the above range, it may be more advantageous to secure dispersion stability of the composite.

In an embodiment of the present application, the composition for 3D printing may form magnetic clusters. By forming the nanoclusters, the nanoparticle-sized magnetic material can prevent agglomeration between the magnetic materials and improve dispersibility, thereby effectively curing the resin by vibrational heat.

In one example, the 3D printing composition of the present application may comprise a curable compound. The curable compound may be a thermosetting resin. The term "thermosetting resin" means a resin that can be cured through application of an appropriate heat or an aging process.

The specific kind of the thermosetting resin in the present application is not particularly limited as long as it has the above-mentioned characteristics. In one example, the thermosetting resin may comprise at least one thermosetting functional group. For example, it may comprise one or more of thermosetting functional groups such as an epoxy group, a glycidyl group, an isocyanate group, a hydroxyl group, a carboxyl group or an amide group, which can be cured to exhibit the adhesive property. In addition, a specific kind of the resin as above may include an acrylic resin, a polyester resin, an isocyanate resin, an ester resin, an imide resin or an epoxy resin, but is not limited thereto.

As the thermosetting resin in the present application, aromatic or aliphatic; or linear or branched epoxy resins may be used. In one embodiment of the present application, an epoxy resin having an epoxy equivalent of 180 g/eq to 1,000 g/eq, which contains two or more functional groups, may be used. By using an epoxy resin having an epoxy equivalent in the above range, properties such as adhesion performance and glass transition temperature of the cured product can be effectively maintained. An example of such an epoxy resin may include one or a mixture of two or more of a cresol novolac epoxy resin, a bisphenol A epoxy resin, a bisphenol A novolac epoxy resin, a phenol novolac epoxy resin, a tetrafunctional epoxy resin, a biphenyl type epoxy resin, a triphenol methane type epoxy resin, an alkyl-modified triphenol methane epoxy resin, a naphthalene-type epoxy resin, a dicyclopentadiene type epoxy resin, or a dicyclopentadiene-modified phenol type epoxy resin.

In the present application, preferably, an epoxy resin containing a cyclic structure in the molecular structure may be used, and more preferably, an epoxy resin containing an aromatic group (e.g., a phenyl group) may be used. When the epoxy resin comprises an aromatic group, the cured product may have excellent thermal and chemical stability. A specific example of the aromatic group-containing epoxy resin that can be used in the present application may be one or a mixture of two or more of a biphenyl type epoxy resin, a dicyclopentadiene type epoxy resin, a naphthalene type epoxy resin, a dicyclopentadiene-modified phenol type epoxy resin, a cresol-based epoxy resin, a bisphenol-based epoxy resin, a xylylol-based epoxy resin, a polyfunctional epoxy resin, a phenol novolac epoxy resin, a triphenol methane type epoxy resin, and an alkyl-modified triphenol methane epoxy resin, and the like, but is not limited thereto.

In an embodiment of the present application, the composite may be included in an amount of 0.01 to 25 parts by weight, 0.1 to 20 parts by weight, 1 to 15 parts by weight, 3 to 13 parts by weight, or 5 to 12 parts by weight, relative to 100 parts by weight of the thermosetting resin. In this specification, unless otherwise specified, the unit "part by weight" means a weight ratio between the respective components. By controlling the content of the composite to the above weight ratio, the present application can cure the composition through sufficient heat upon 3D printing, and can uniformly cure the composition without phase separation of the composition.

Here, as described above, the composition for 3D printing may further comprise a thermosetting agent. For example, it may further comprise a curing agent capable of reacting with the thermosetting resin to form a cross-linked structure or the like.

As the curing agent, an appropriate type may be selected and used according to the type of the functional group contained in the resin.

In one example, when the thermosetting resin is an epoxy resin, as the curing agent, a curing agent of the epoxy resin known in this field, for example, one or two or more of an amine curing agent, an imidazole curing agent, a phenol curing agent, a phosphorus curing agent, or an acid anhydride curing agent may be used, without being limited thereto.

In one example, as the curing agent, an imidazole compound which is solid at room temperature and has a melting point or a decomposition temperature of 80° C. or higher may be used. As this compound, 2-methylimidazole, 2-heptadecylimidazole, 2-phenylimidazole, 2-phenyl-4-methylimidazole or 1-cyanoethyl-2-phenylimidazole, and the like can be exemplified, but is not limited thereto.

The content of the curing agent may be selected depending on composition of the composition, for example, the kind and ratio of the thermosetting resin. For example, the curing agent may be included in an amount of 1 to 20 parts by weight, 1 to 10 parts by weight, or 1 to 8 parts by weight, relative to 100 parts by weight of the thermosetting resin. However, the weight ratio can be changed depending on the kind and ratio of the functional group of the thermosetting resin, the cross-linking density to be implemented, and the like.

In an embodiment of the present application, the 3D printing composition may further comprise a filler. The filler may be an organic filler, an inorganic filler, or a mixture thereof. The specific kind of the filler that can be used in the present application is not particularly limited and for example, one or a mixture of two or more of carbon black, carbon nanotubes, glass fiber, silica, synthetic rubber, TiO$_2$, an organic/inorganic pigment, clay, or talc, and the like may be used. The filler may be included in an amount of 1 to 100 parts by weight, 10 to 80 parts by weight, or 20 to 60 parts by weight, relative to 100 parts by weight of the thermosetting resin. By using the filler, the present application can ensure the mechanical properties (rigidity, reinforcement) after the composition is cured, and improve dispersibility and bonding property between the nano-sized magnetic material and the organic material.

In an embodiment of the present application, the composition for 3D printing of the present application may comprise a thermoplastic resin. The thermoplastic resin may include, for example, an acrylic resin, a silicone resin, a fluororesin, a styrene resin, a polyolefin resin, a thermoplastic elastomer, a polyoxyalkylene resin, a polyester resin, a polyvinyl chloride resin, a polycarbonate resin, a polyphenylene sulfide resin, polyurethane, a cellulose resin, a polyacetal resin or a polyamide resin.

Here, as the styrene resin, styrene-ethylene-butadiene-styrene block copolymer (SEBS), styrene-isoprene-styrene block copolymer (SIS), acrylonitrile-butadiene-styrene block copolymer (ABS), acrylonitrile-styrene-acrylate block copolymer (ASA), styrene-butadiene-styrene block copolymer (SBS), styrene homopolymer or a mixture thereof can be exemplified. As the olefin resin, for example, a high-density polyethylene-based resin, a low-density polyethylene-based resin, a polypropylene-based resin, or a mixture thereof can be exemplified. As the thermoplastic elastomer, for example, an ester-based thermoplastic elastomer, an olefin-based thermoplastic elastomer or a mixture thereof and the like can be used. Particularly, as the olefin-based thermoplastic elastomer, a polybutadiene resin or a polyisobutylene resin and the like can be used. As the polyoxyalkylene resin, for example, a polyoxymethylene resin, a polyoxyethylene resin or a mixture thereof can be exemplified. As the polyester resin, for example, a polyethylene terephthalate resin, a polybutylene terephthalate resin or a mixture thereof and the like can be exemplified. As the polyvinyl chloride resin, for example, polyvinylidene chloride and the like can be exemplified. In addition, a mixture of hydrocarbon resins can be included, and for example, hexatriacotane or paraffin and the like can be exemplified. As the polyamide resin, for example, nylon and the like can be exemplified. As the acrylate resin, for example, polybutyl (meth)acrylate and the like can be exemplified. As the silicone resin, for example, polydimethylsiloxane and the like can be exemplified. Furthermore, as the fluororesin, polytrifluoroethylene resin, polytetrafluoroethylene resin, polychlorotrifluoroethylene resin, polyhexafluoropropylene resin, polyfluorinated vinylidene, polyfluorinated vinyl, polyfluorinated ethylene propylene or a mixture thereof, and the like can be exemplified.

The above-listed resins may be also used, for example, by being grafted with maleic anhydride or the like, or by being copolymerized with the other resins as listed or monomers for producing resins, or by being modified with other compounds. An example of such other compounds may include carboxyl-terminal butadiene-acrylonitrile copolymer and the like.

The composition for 3D printing according to the present application may comprise various additives depending on applications, the kind of the thermosetting resin, and the 3D printing process described below, in addition to the above-described constitutions, in the range without affecting the above-described effects of invention. For example, the resin composition may comprise a coupling agent, a cross-linking agent, a curable material, a tackifier, an ultraviolet stabilizer, or an antioxidant in an appropriate amount depending on the desired physical properties. Here, the curable material may mean a material having a thermosetting functional group and/or an active energy ray-curable functional group, which is separately included in addition to the components constituting the above-mentioned composition.

The present application also relates to a 3D printing method. An exemplary 3D printing method may comprise a step of applying the above-described composition in three dimensions to form a three-dimensional shape. In the 3D printing method according to the present application, the composition is applied in a three-dimensional manner to form a three-dimensional shape, and then, the vibrational heat is generated from the magnetic particles through the magnetic field application step, whereby the composition can be uniformly cured.

The step of applying a magnetic field is not particularly limited and can be performed with a known method by those skilled in the art. For example, the step of applying a magnetic field may be performed by applying a magnetic field with a current of 50 A to 500 A, 80 A to 450 A, or 120 A to 430 A at a frequency of 100 kHz to 1 GHz for 20 seconds to 60 minutes, 30 seconds to 30 minutes, or 30 seconds to 200 seconds.

In one example, the step of applying a magnetic field may comprise at least two steps of multi-profile methods. The multi-profile method may be performed at a frequency of 100 kHz to 1 GHz. Specifically, the multi-profile method may comprise a first step of applying a magnetic field with a current of 10 A to 80 A for 20 seconds to 10 minutes, a second step of applying a magnetic field with a current of 80 A to 130 A for 20 seconds to 10 minutes and/or a third step of applying a magnetic field with a current of 150 A to 500 A for 5 seconds to 5 minutes.

In addition, the step of applying a magnetic field may also proceed in a manner that gives a gradient difference of the profile. For example, in the case of the multi-profile method, it is a method of applying the magnetic field by controlling the intensity of the magnetic field stepwise, but the method of giving a gradient difference is a method of sequentially raising the magnetic field with 100 to 200 A at an interval, which can block rapid exotherm and prevent characteristic deterioration of the cured product to cause thermal degradation depending on characteristics of the resin to be cured upon rapidly applying heat.

On the other hand, the thermosetting can proceed with application of the magnetic field as described above, and may comprise additionally applying heat at 40° C. to 100° C. for 30 minutes to 24 hours, after applying the magnetic field. Furthermore, without being limited to the above, it is possible to apply heat together with applying the magnetic field.

The present application also relates to a three-dimensional solid shape. The three-dimensional shape may comprise a cured product of the above-mentioned composition for 3D printing.

The present application also relates to a microelectronic device. An exemplary microelectronic device may comprise a cured product comprising the above-described composition. The cured product may be applied as a sealing material, but is not limited thereto. For example, the microelectronic device may include a micro battery, a biosensor, an actuator or the like. In addition, the present application can provide a display device using the above-described composition as a sealing material or the like.

Advantageous Effects

The present application provides a composition capable of precisely forming a three-dimensional solid shape and realizing uniform curing physical properties of a three-dimensional shape.

BRIEF DESCRIPTION OF DRAWINGS

FIG. 1 is photographs showing the compositions for 3D printing prepared in Examples and Comparative Examples of the present invention.

BEST MODE

Hereinafter, the present invention will be described in more detail with reference to Example complying with the present invention and Comparative Examples not complying with the present invention, but the scope of the present invention is not limited by the following examples.

Example 1

0.2 g of magnetic particles ($Fe_2O_3$ particles, multi-magnetic domains, average particle diameter: about 100 nm: measured by Field Emission Scanning Electron Microscope (using DLS)) are treated through diluted hydrochloric acid, and reactive groups on the surface of the magnetic particles are activated to form positive charges on the surface. The acid-treated magnetic particles are dispersed in a polyacrylic acid aqueous solution and treated with about 120 W ultrasonic waves for 15 minutes. Magnetic particle-glass bubble particle composites are produced by reacting 0.3 g of glass bubble particles whose surface is substituted with amine groups (average particle diameter about 18 μm) and the magnetic particles in the aqueous solution such that the magnetic particles surround the surface of the glass bubble particles.

Separately from the above, KSR-177 from Kukdo Chemical as an epoxy resin and an imidazole-based curing agent of Shikoku Kasei C11ZA as a curing agent were mixed at a weight ratio of 90:5 (KSR-177:C11ZA). A composition for 3D printing was prepared by dispersing the magnetic composites prepared in advance in the mixture so as to have a solid content of 5 wt %.

Immediately after laminating the prepared composition on a support through a nozzle in a feeding device, a magnetic field was applied thereto with a current value of 100 A for 180 seconds in an external alternate-current magnetic field generator. The magnetic field was applied by introducing the composition into a sample vial in a solenoid coil (3 turns, OD 50 mm, ID 35 mm) and adjusting the current value and time of the magnetic field generator (Easyheat from Ambrell). The resin composition was cured with vibrational heat generated through application of the magnetic field to form a pattern or a three dimensional shape.

Example 2

A composition for 3D printing was prepared and a three-dimensional shape was formed, in the same manner as in Example 1, except that $MnOFe_2O_3$ particles (multi-magnetic domains, average particle diameter about 100 nm: measured by Field Emission Scanning Electron Microscope (using DLS)) were used as the magnetic particles.

Comparative Example 1

Ferromagnetic (hard type) $Fe_2O_3$ particles (single-magnetic domain, average particle diameter about 100 nm) as magnetic particles, a bisphenol-based epoxy resin and a curing agent were each mixed at a weight ratio of 5:95:5 to prepare a resin composition.

Immediately after laminating the prepared composition on a support through a nozzle in a feeding device, a magnetic field was applied thereto with a current value of 100 A for 180 seconds in an external alternate-current magnetic field generator. The magnetic field was applied by introducing the composition into a sample vial in a solenoid coil (3 turns, OD 50 mm, ID 35 mm) and adjusting the current value and time of the magnetic field generator (Easyheat from Ambrell). The resin composition was thermally cured with vibrational heat generated through application of the magnetic field to form a pattern or a three-dimensional shape.

Experimental Example 1—Measurement of Coercive Force and Saturation Magnetization Value (Ms) of Magnetic Particles Coercive force and saturation magnetization Ms were measured by placing the magnetic particles dried at room temperature in a vibrating sample magnetometer (SQUID, measured by Korea Basic Science Institute) and using an HS curve (VSM curve) at ±1 Tesla as an external magnetic field.

Experimental Example 2—Measurement of Temperature of Composition after Curing

For each three-dimensional shape produced in Examples and Comparative Example, immediately after the magnetic field application, a temperature inside the three-dimensional shape is confirmed by sticking a thermocouple therein.

Experimental Example 3—Measurement of Cure Degree (Visual Touch Sense)

After curing each composition in Examples and Comparative Example, it was confirmed whether or not the cured product flowed when it was turned over after cooling, and then the curing was confirmed by checking the pressing degree of the cured product with a metal spatula. Here, it can be confirmed that when the cured product has been flowable and pressed, it has been not cured.

Experimental Example 4—Confirmation of Dispersibility Before Curing

When the magnetic composites prepared in Example 1 and the magnetic particles in Comparative Example 1 were dispersed in PDMS (polydimethylsiloxane), respectively, they were observed immediately, 30 minutes and 2 hours after the dispersion, and the results were shown in order from the left side in FIG. 1 (as made, after 30 minutes, and after 2 hours). In FIG. 1, the left bottle is the result according to Comparative Example 1, and the right bottle is the result according to Example 1. As in FIG. 1, it could be confirmed that the magnetic particles according to Comparative Example 1 exhibited noticeable phase separation.

TABLE 1

| | Ms (emu/g) | Coercive Force (kOe) | Temperature after Curing (° C.) | Measurement of Cure Degree Visual Touch Sense |
|---|---|---|---|---|
| Example 1 | 72 | 70 | 71 | cured |
| Example 2 | 80 | 94 | 76 | cured |
| Comparative Example 1 | 218 | 2000 | 35 | non-cured |

What is claimed is:

1. A composition for 3D printing comprising:
   magnetic particles having two or more magnetic domains; and
   gas-containing particles,
   wherein the magnetic domains are configured to be irregularly arranged when an external magnetic field is absent and are configured to be magnetized by an external alternate-current magnetic field, and
   wherein the magnetic particles and the gas-containing particles have surfaces that are physically or chemically bonded to each other.

2. The composition for 3D printing according to claim 1, wherein the magnetic particles and the gas-containing particles are included in a magnetic composite, and
   wherein, in the magnetic composite, the magnetic particles surround the gas-containing particles, or the gas-containing particles surround the magnetic particles.

3. The composition for 3D printing according to claim 2, wherein the magnetic composite has a density of 0.1 g/cm$^3$ to 10 g/cm$^3$.

4. The composition for 3D printing according to claim 1, wherein the magnetic particles comprise pure iron, iron oxide, ferrite, iron alloy, cobalt alloy, nickel alloy or manganese alloy.

5. The composition for 3D printing according to claim 1, wherein the magnetic particles have a coercive force in a range of 1 to 200 kOe.

6. The composition for 3D printing according to claim 1, wherein the magnetic particles have a saturation magnetization value at 25° C. in a range of 20 to 150 emu/g.

7. The composition for 3D printing according to claim 1, wherein the magnetic particles have an average particle diameter in a range of 20 to 300 nm.

8. The composition for 3D printing according to claim 1, wherein the magnetic domains have an average size in a range of 10 to 50 nm.

9. The composition for 3D printing according to claim 1, wherein the gas-containing particles are hollow particles.

10. The composition for 3D printing according to claim 1, wherein the gas-containing particles comprise an inorganic material, an organic material or an organic-inorganic composite.

11. The composition for 3D printing according to claim 1, wherein the gas-containing particles have an average size in a range of 10 nm to 100 μm.

12. The composition for 3D printing according to claim 1, wherein the gas-containing particles have a density of 0.01 g/cm$^3$ to 1.02 g/cm$^3$.

13. The composition for 3D printing according to claim 1, wherein the composition comprises the gas-containing particles in an amount of 80 to 200 parts by weight relative to 100 parts by weight of the magnetic particles.

14. The composition according to claim 1, further comprising a dispersant.

15. The composition for 3D printing according to claim 1, further comprising a thermosetting resin.

16. The composition for 3D printing according to claim 1, wherein the magnetic particles are configured to form magnetic clusters.

17. The composition for 3D printing according to claim 1, wherein the magnetic particles are configured to be vibrated by magnetization reversal.

18. A 3D printing method comprising forming a three-dimensional object with the composition for 3D printing of claim 1.

19. A three-dimensional object comprising a cured product of the composition for 3D printing of claim 1.

20. The composition for 3D printing according to claim 1, wherein the gas-containing particles are glass particles.

* * * * *